| United States Patent [19] | [11] | 4,203,876 |
|---|---|---|
| Dereppe et al. | [45] | May 20, 1980 |

[54] MOLDABLE COMPOSITIONS BASED ON THERMOPLASTIC POLYMERS, SYNTHETIC ELASTOMERS AND VEGETABLE FIBROUS MATERIALS, AND USE OF THESE COMPOSITIONS FOR CALENDERING AND THERMOFORMING

[75] Inventors: Michel Dereppe, Brussels; Jean Leva, Limelette, both of Belgium

[73] Assignee: Solvay & Cie., Brussels, Belgium

[21] Appl. No.: 880,486

[22] Filed: Feb. 23, 1978

[30] Foreign Application Priority Data

Feb. 28, 1977 [FR] France ................................. 77 06029

[51] Int. Cl.$^2$ .............................................. C08L 23/04
[52] U.S. Cl. ........................ 260/17.4 R; 260/17.4 BB
[58] Field of Search ..................... 260/17.4 R, 17.4 BB

[56] References Cited

U.S. PATENT DOCUMENTS

| 2,872,430 | 2/1959 | Parker et al. .................. 260/17.4 R |
| 2,888,433 | 5/1959 | Parker ............................ 260/17.4 R |
| 3,406,127 | 10/1968 | Alexander ....................... 260/859 R |
| 3,888,810 | 6/1975 | Shinomura .................... 260/17.4 BB |
| 3,917,501 | 11/1975 | Ferrucci et al. ................ 260/17.4 R |
| 3,976,608 | 8/1976 | Buckler et al. ................. 260/17.4 R |

FOREIGN PATENT DOCUMENTS 1164387 9/1969 United Kingdom .

*Primary Examiner*—Maurice J. Welsh
*Attorney, Agent, or Firm*—Spencer & Kaye

[57] ABSTRACT

Moldable composition based on thermoplastic polymers and vegetable fibrous materials and containing a synthetic elastomer.

10 Claims, No Drawings

MOLDABLE COMPOSITIONS BASED ON THERMOPLASTIC POLYMERS, SYNTHETIC ELASTOMERS AND VEGETABLE FIBROUS MATERIALS, AND USE OF THESE COMPOSITIONS FOR CALENDERING AND THERMOFORMING

BACKGROUND OF THE INVENTION

The present invention relates to moldable compositions based on thermoplastic polymers and vegetable fibrous materials. It also relates to the use of these compositions, which possess improved suitability for shaping by the conventional molding processes, for the thermoforming of articles from sheets or panels.

Moldable compositions based on thermoplastic polymers and vegetable fibrous materials, such as wood flour, are already known.

It is also known that the articles molded from these compositions exhibit advantageous properties, for example, good impact strength and good rigidity in the case of compositions based on propylene homopolymers and on wood (E. L. SOULE and H. E. HENDRICKSON, FOREST PRODUCTS JOURNAL, vol. 16, pages 17–22, 1966; German patent application No. 1,769,178 in the name of B.A.S.F.) or good impact strength and good resistance to moisture in the case of compositions based on polyethylene and on wood (German Pat. No. 1,241,981 in the name of RUHRCHEMIE).

However, these compositions themselves exhibit the serious disadvantage that they are difficult to process and to shape by the conventional techniques.

Thus, it has been found, on processing by injection techniques, that the injectability of these compositions was mediocre and that the high temperatures required frequently resulted in their degradation.

Furthermore, an important outlet for these compositions is the manufacture of shaped articles from extruded or calendered sheets or panels. However, when these compositions are calendered, it is found that the sheets tend to stick to the hot rolls. In addition, serious difficulties are encountered in the course of shaping these sheets, in particular when they are folded, stapled and the like. Finally, in the majority of cases, where vacuum thermoforming is carried out, the suction must be assisted by a male matching mold and the final appearance of the thermoformed articles nevertheless leaves something to be desired.

French Application No. 76,39191, available to the public July 22nd, 1977, discloses compositions containing 99 to 70 parts by weight of a crystalline polyolefin modified by grafting and 1 to 30 parts by weight of an elastomer. The incorporation of vegetable fibrous materials, such as sawdust, in these compositions is not envisioned.

SUMMARY OF THE INVENTION

There have now been found, in accordance with the present invention, moldable compositions based on thermoplastic polymers and vegetable fibrous materials which no longer exhibit the above disadvantages and which result in molded articles of which the impact strength is improved yet further.

The present invention provides moldable compositions based on a thermoplastic polymer and vegetable fibrous materials, which furthermore contain a synthetic elastomer.

The use of the compositions according to the present invention for conversion into sheets or panels by calendering, and for the thermoforming of articles from these sheets or panels, constitutes further aspects of the present invention.

It has, in fact, been found that these compositions possess greater suitability for calendering, and it has furthermore been found that the thermoforming of sheets obtained from the moldable compositions according to the present invention results, with a simplified technology, in homogeneous shaped articles of uniform thickness, which have an attractive final appearance, better impact strength and good rigidity.

DETAILED DESCRIPTION OF THE INVENTION

All thermoplastic polymers which are sufficiently compatible with vegetable fibers are suitable for the production of compositions according to the present invention.

By way of thermoplastic polymers which are suitable for producing such compositions, there may be mentioned, for example, polyamides, polyolefins, polyacetal, polycarbonates, polystyrene, vinyl resins and acrylic resins. However, it is preferred to select the thermoplastic polymer from among vinyl resins and polyolefins.

The preferred vinyl resins are those resulting from the homopolymerization of chlorine-containing vinyl monomers, especially vinyl chloride, and from the copolymerization of these monomers with one another or with other monomers copolymerizable with them. By way of examples of these copolymers, there may be mentioned the copolymers of vinyl chloride with vinyl esters such as vinyl acetate, with acrylic esters such as methyl acrylate, with unsaturated nitriles such as acrylonitrile, with styrene derivatives and with alpha-olefins such as ethylene and propylene. Polyvinylacetal homopolymers and copolymers are also suitable.

The term polyolefins as used herein is intended to denote the thermoplastic polymers resulting from the homopolymerization of olefins in which the unsaturation is in the terminal position and the molecule contains from 2 to 20 carbon atoms, especially ethylene and propylene, and from the copolymerization of these olefins with one another as well as with other monomers copolymerizable with them. These other copolymerizable monomers can be, for example, diolefins such as butadiene, isoprene and the hexadienes.

The resulting copolymers can be either random copolymers or so-called "block" copolymers. These block copolymers consist of successions of chain segments of varying lengths. Each segment consists of a homopolymer of an alpha-olefin or of a random copolymer comprising two or more comonomers as defined above.

Thermoplastic polymers particularly preferred for producing the compositions according to the present invention are polyethylenes and more particularly polypropylenes. These may be homopolymers of ethylene or of propylene and copolymers containing in total at least 90 mol % of one of these monomers. If ethylene polymers are used, polymers of high density, that is to say of density at least about 0.955, are preferred. If propylene polymers are used, they are advantageously chosen from among the homopolymers which have a melt index (melt-flow index measured in accordance with Standard Specification ASTM D 1238 under a load of 2.16 kg at 230° C. and expressed in dg/min.) of between about 0.5 and about 4, preferably between about 1.5 and 3. Such polymers are above all advantageous if the compositions according to the present invention are intended to be calendered and then thermoformed. In fact, in this case, the composition detaches from the calendering rolls if the melt index is too low. If the melt index of the polymer is too high, the suitability for thermoforming of the calendered sheet diminishes. The thermoplastic polymer can be used in any form which allows it to be mixed with vegetable fibers. Preferably, it is devoid of large particles. It can be in the form of a powder, of particles, of granules, of flakes, of fibers, of ground scrap and the like.

The term vegetable fibrous materials as used herein is intended to denote principally at least one of the lignocellulosic materials produced from wood or other vegetable matter. It is preferred to employ materials originating from the wood of conifers or of deciduous trees. By way of products which originate from wood and which can be suitable there may be mentioned, for example, the products obtained from pine, eucalyptus, beech, oak, poplar and the like. The most advantageous results, in particular from an economic point of view, are obtained with the products originating from pine.

These vegetable materials can be employed in any form. Preferably, they are used in the form of particles having a mean size of between 0.05 and 1 mm, more specifically of the order of 0.2 mm, in particular if they are intended for calendering compositions. These wood particles are frequently in the form of flour or of sawdust, the water content of which does not exceed 15% by weight.

Though materials originating from wood are preferred for producing the compositions according to the present invention, the use of other vegetable fibrous materials such as straw, cork, maize cobs, textile fibers and the like is in no way excluded from the scope of the invention.

The moldable compositions according to the present invention are characterized in that they furthermore contain a synthetic elastomer. All synthetic elastomers of sufficient compatibility with the other constituents of the compositions according to the present invention can be used. By way of examples of elastomers which can be used, there may be mentioned:

the elastomers resulting from the homopolymerization of conjugated diolefins, such as butadiene, of their substituted derivatives such as isoprene or of their halogen-containing derivatives such as chloroprene, and from the copolymerization of these diolefins with other monomers such as, for example, styrene, acrylonitrile and isobutene;

the copolymers of ethylene with vinyl esters, in particular the copolymers containing from 15 to 35% by weight of vinyl acetate;

the copolymers of ethylene with another copolymerizable alpha-monoolefin and the terpolymers of ethylene with another alpha-monoolefin and with a non-conjugated diolefin, which have an essentially amorphous structure;

the silicones;
the polysulfides;
the chlorinated and chlorosulfonated polyethylenes;
the polyurethanes;
polyisobutene and the like.

The synthetic elastomers which are preferred for producing the compositions according to the present invention are the copolymers, of essentially amorphous structure, of ethylene with another copolymerizable alpha-monoolefin and optionally with a non-conjugated diolefin.

The copolymerizable alpha-monoolefin is preferably propylene. As regards the non-conjugated diolefins combined with the other monomers in the terpolymers, they are oreferably chosen from among:

the non-conjugated aliphatic diolefins such as 1,4-pentadiene, 1,5-hexadiene and 1,4-hexadiene;

the non-conjugated monocyclic diolefins such as 4-vinylcyclohexene, 1,3-divinylcyclohexane, 1,4-cycloheptadiene and 1,5-cyclooctadiene; and the non-conjugated alicyclic diolefins which possess an endocyclic bridge such as dicyclopentadiene, norbornadiene, methylenenorbornene and ethylidenenorbornene.

Copolymers which are particularly interesting as synthetic elastomers are those which contain between 10 and 90 mol %, and preferably between 20 and 60 mol %, of propylene as the copolymerizable alpha-olefin.

The synthetic elastomers can be used in any form which allows them to be mixed with the other constituents of the composition, for example in the form of powder, of beads and the like.

The amounts of thermoplastic polymer, of vegetable fibrous materials and of synthetic elastomer present in the compositions according to the present invention are not critical. However, in order to ensure correct molding and shaping of these compositions, it is preferred to incorporate the constituents of the composition in the proportions specified below. The content of vegetable fibrous materials of the compositions is defined relative to the weight of thermoplastic polymer. In general, the compositions according to the present invention contain 30 to 250 parts by weight of vegetable fibrous materials per 100 parts by weight of thermoplastic polymer and preferably 70 to 150 parts per 100 parts. The best results are obtained if the compositions contain approximately equal weights of thermoplastic polymer and of vegetable fibrous materials. An excess of thermoplastic polymer makes the compositions more expensive. A shortage of thermoplastic polymer detracts from the cohesion of the compositions and makes them difficult to calender.

The content of synthetic elastomer in the compositions is defined relative to the total weight of thermoplastic polymer and of vegetable fibrous materials incorporated therein.

This content is generally between 2 and 15% of the said total weight and preferably between 3 and 8%. High contents within this range improve the suitability for calendering. Conversely, for thermoforming the compositions, the best results have been recorded with compositions containing about 5% by weight of synthetic elastomer relative to the total weight of thermoplastic polymer and of vegetable fibrous materials incorporated therein. Excessive amounts of synthetic elastomer detract from the rigidity of the articles molded and shaped from the compositions according to the present invention.

The moldable compositions which are very particularly preferred, according to the present invention, for the manufacture of articles by thermoforming of sheets and panels thus comprise approximately equal weights of a propylene homopolymer having a melt index of between about 1.5 and 3 and of wood particles of which the particle size is of the order of 0.2 mm, and about 5% by weight, relative to the total weight of homopolymer and of wood, of a copolymer based on ethylene and containing between 20 and 60 mol % of propylene.

The incorporation of the vegetable fibrous materials and the synthetic elastomer into the thermoplastic polymer does not present any particular problem and is carried out in a manner which is in itself known, for example in an internal mixer, a screw mixer or the like.

The compositions according to the present invention can, of course, contain the usual additives for processing thermoplastic polymers, such as lubricants, plasticizers, stabilizers, pigments, and the like. If the compositions according to the present invention contain wood, they can, of course, contain agents which neutralize the acidity of the latter, such as, for example, sodium silicate.

The compositions according to the present invention can be employed in accordance with any of the known molding techniques, namely by extrusion, by calendering, by injection and the like. They are very particularly suitable for the shaping of articles from sheets and panels. These sheets and panels can be obtained in a manner which is in itself known, for example by extrusion of slugs which are pressed in cooled presses, by extrusion through flat dies, and, preferably, by hot calendering, of the compositions according to the present invention.

In the last-mentioned case, the composition, brought to a temperature above the melting point of the thermoplastic polymer (above 165° C. in the case of propylene homopolymers) and below the combustion temperature of the vegetable fibrous materials, in an internal mixer of the Werner or Banbury type, is received on an external roll mill which converts the successive batches of mixture delivered by the internal mixer into a continuous strip which can be introduced into the calendering installation via a conveyor belt. The sheets or panels leaving the last calendering roll, when reheated to the above-mentioned temperature, directly or after storage, are shaped either under pressure in cold or heated molds or by vacuum thermoforming.

It has been found, surprisingly, that the incorporation of the synthetic elastomer into the compositions according to the present invention greatly facilitates the calendering of sheets and of panels and the work of subsequently shaping these sheets and panels and, in particular, the operations of folding, of close-set stapling along a line and, above all, of thermoforming. Thus, it has been found, unexpectedly, that vacuum thermoforming of the sheets made from the compositions according to the present invention gave articles of faultless final appearance without it being necessary to employ a male matching mold.

The calendered sheets obtained from the moldable compositions according to the present invention can advantageously be used to manufacture, by thermoforming, cases or crates intended for the storage and transportation of perishable products such as fruits and vegetables.

The example which follows illustrates the invention without implying a limitation.

EXAMPLE

The following are introduced into an internal mixer:

38 parts by weight of a propylene homopolymer having a melt index of 1.5 dg/min (Standard Specification ASTM D 1238; 2.16 kg load; 230° C.) containing a normal amount of customary stabilizers;

55 parts by weight of pine sawdust (mean size 0.2 mm), having a water content of less than 15%; and 7 parts by weight of a terpolymer containing about 69 mol % of ethylene, 29.5 mol % of propylene and 1.5 mol % of ethylene-norbornene.

The batches delivered by the internal mixer, preheated to 170° C., are received on the rolls of an external mill heated to 125° C., and the strip taken therefrom is transferred to a calendering installation comprising 4 rolls arranged in the shape of an L.

The sheet leaving the last calendering roll has a uniform thickness of 1.4 mm. This hot sheet is then fed to a SENDLER type 1061-ENS vacuum thermoforming installation for shaping fruit crates possessing lengthwise bulges on their side walls. The bulges produced are perfectly uniform over their entire length without it being necessary to employ a male matching mold to produce a stamping effect. Furthermore, during the final assembly of the crate, no cracking is observed either at the positions of folds or at the positions where a wooden reinforcement is stapled to the four corners.

By way of comparison, crates are produced in accordance with the technique described above, but using a composition containing 45 parts by weight of the propylene homopolymer and 55 parts by weight of pine sawdust, in the absence of a terpolymer.

It was not possible to obtain well-formed lengthwise bulges without the assistance of a male matching mold to produce a stamping effect. Furthermore, cracks are repeatedly found where the material is folded and where it is stapled.

It will be understood that the above description of the present invention is susceptible to various modifications, changes and adaptations, and the same are intended to be comprehended within the meaning and range of equivalents of the appended claims.

What is claimed is:

1. Moldable composition consisting essentially of a thermoplastic polyolefin and vegetable materials, wherein the composition furthermore contains a synthetic elastomer.

2. Compositions according to claim 1, wherein the synthetic elastomer is a copolymer, having an essentially amorphous structure, of ethylene with another alpha-monoolefin.

3. Composition according to claim 2, wherein the other alpha-monoolefin is propylene.

4. Composition according to claim 2, wherein the copolymer furthermore contains a non-conjugated diolefin selected from the group consisting of aliphatic diolefins, monocyclic diolefins and alicyclic diolefins possessing an endocyclic bridge.

5. Composition according to claim 1, wherein the thermoplastic polyolefin is selected from the group consisting of homopolymers of ethylene or of propylene and copolymers containing in total at least 90 mol % of one of these monomers.

6. Composition according to claim 1, wherein the vegetable fibrous materials are materials originating from wood.

7. Composition according to claim 1, comprising between 2 and 15% of synthetic elastomer relative to the total weight of thermoplastic polymer and of vegetable fibrous material.

8. Composition according to claim 1, comprising 30 to 250 parts by weight of vegetable fibrous materials per 100 parts by weight of thermoplastic polyolefin.

9. Process for producing sheets or panels by hot calendering, comprising calendering a composition according to claim 1.

10. Process for thermoforming sheets or panels, comprising thermoforming sheets or panels obtained from compositions according to claim 1.

* * * * *